United States Patent [19]
Tilley et al.

[11] Patent Number: 5,227,240
[45] Date of Patent: Jul. 13, 1993

[54] UV CURABLE COATING COMPOSITIONS, ABRASION RESISTANT UV STABILIZED THERMOPLASTIC COMPOSITES AND METHOD

[75] Inventors: Mark G. Tilley, Schenectady; Peter M. Miranda, Scotia, both of N.Y.

[73] Assignee: General Electric Company, Schenectady, N.Y.

[21] Appl. No.: 902,218

[22] Filed: Jun. 22, 1992

Related U.S. Application Data

[62] Division of Ser. No. 741,695, Aug. 7, 1991, Pat. No. 5,162,390.

[51] Int. Cl.$^5$ .............................. B05D 3/06; B32B 27/36
[52] U.S. Cl. ................................. 428/412; 156/242; 156/244.17; 156/272.2; 427/164; 427/558

[58] Field of Search ............... 156/242, 244.17, 272.2, 156/273.3, 273.5; 427/558, 164

*Primary Examiner*—Michael Lusigan
*Attorney, Agent, or Firm*—William A. Teoli; William H. Pittman

[57] ABSTRACT

Organophosphorus compounds capable of being activated with light at from 360 nm to about 410 nm, such as, an acylphosphine oxide, have been found useful as photoinitiators for effecting the cure of various UV curable coating compositions, such as a UV curable organic material in the presence of up to 20% by weight of a UV absorber. UV stabilized thermoplastic composites of films, sheets, or laminates having thickness of up to an inch or more with improved optical clarity also are provided.

6 Claims, No Drawings

UV CURABLE COATING COMPOSITIONS, ABRASION RESISTANT UV STABILIZED THERMOPLASTIC COMPOSITES AND METHOD

This application is a division of application Ser. No. 07/741,695, filed Aug. 7, 1991, now U.S. Pat. No. 5,262,390.

BACKGROUND OF THE INVENTION

The present invention relates to UV curable organic coating compositions, such as a UV curable organic material, a UV curable organosilicon material, or a mixture thereof, in combination with a photoinitiator in the form of an acylphosphorus compound capable of being activated by light with a wavelength in the range of from about 360 nm to about 410 nm and selected from the class consisting of acylphosphine oxides, acyl phosphonates and acylphosphine sulphides, and up to about 20% by weight of the UV curable coating composition of a UV screen. More particularly, the present invention relates to certain weather and abrasion resistant thermoplastic composites having thicknesses of up to 1 inch, or more which can exhibit improved optical clarity, and which comprise a thermoplastic substrate such as a polycarbonate film or sheet, and a cured polyacrylic or polyacrylic-urethane coating.

Prior to the present invention, as shown by Clark, U.S. Pat. No. 4,072,073, heat curable silicone hard coat formulations were available which could be applied to a variety of thermoplastic substrates, such as polycarbonate or polyester in the form of film or sheet. Although useful results can be obtained by employing such heat curable coating compositions, an organic solvent is used which is environmentally unattractive. In addition, long process times are required to make a satisfactory abrasion and weather resistant composite of a thermoplastic substrate and hard coat.

Abrasion resistant thermoplastic composites having improved optical properties also can be made by effecting the cure of a solventless radiation curable coating composition which has been applied onto the surface of a polymeric sheet or film. The cure of the applied coating material can be effected while it is in contact with a smooth surface (cold casting) by directing radiant energy through the substrate opposite the surface being coated. The "cold-casting technique" is further illustrated in the copending application of Crouch, Ser. No. 812,619, filed Dec. 23, 1985. Although improved surface characteristics can be achieved with the radiation curable coating compositions of Crouch, the resulting abrasion resistant thermoplastic film can suffer from reduced weathering resistance unless a latent UV screen is used which does not interfere with the cure of the UV curable coating composition while it is on the substrate.

Suitable latent UV screens, are for example, sulfonate esters of hydroxybenzotriazoles, as shown by Olson, U.S. Pat. No. 4,344,830, which is incorporated herein by reference. These latent UV screens can impart improved weathering resistance over extending periods of time, while simultaneously allowing the cure of the radiation curable coating. Although composites of thermoplastic films having thicknesses up to about 30 mils, or sheets having thicknesses of up to about an inch can be made by treating the films or sheets with a UV curable coating composition and thereafter effecting the cure of the coating composition in the presence of a latent UV screen, experience has shown that latent UV screens often have limited solubility in the coating composition. In addition, these latent UV screens frequently separate from the cured resin after an extended weathering period resulting in a marred, unattractive surface.

It would be desirable therefore to provide solventless UV curable coating compositions which are capable of imparting improved weathering and abrasion resistance to a variety of thermoplastic substrates in a relatively short period of time when applied and cured thereon. It also would be desirable to provide compositions of thermoplastic films or sheets having a UV cured abrasion resistant polyacrylic or polyacrylic-urethane coating having a thickness of about 4 to 15 microns which can contain an effective amount of a conventional instead of a latent UV absorber, and possess superior optical characteristics.

SUMMARY OF THE INVENTION

The present invention is based on the discovery that the employment of a photoinitiator, such as an acylphosphorus compound, for example, an acylphosphine oxide, having a spectral response in the range of between about 360 nm to about 410 nm, can be used to initiate the photopolymerization of various UV curable organic or UV curable organosilicon materials in the presence of up to 20% by weight of a conventional UV absorber, such as a 2-hydroxybenzophenone, or a 2-hydroxyphenyl-2H-benzotriazole.

STATEMENT OF THE INVENTION

There is provided by the present invention, a UV curable coating composition comprising a UV curable organic material, a UV curable organosilicon material, or a mixture thereof, an amount of an acylphosphorus compound which is effective for polymerizing the radiation curable organic coating composition upon exposure to radiation, and from about 0.5% to about 20% by weight of a UV screen, based on the total weight of the UV curable organic coating composition, where the acylphosphorus compound can be activated by light having a wavelength in the range of from about 360 nm to about 410 nm and is a member selected from the class consisting of acylphosphine oxides, acyl phosphonates and acylphosphine sulphides.

Some of the acylphosphorus compounds which can be used in the practice of the invention are for example, 2,4,6-triorganobenzoyldiarylphosphine oxides, such as, 2,4,6-trimethylbenzoyldiphenylphosphine oxide and 2,4,6-triethylbenzoyldinaphthylphosphine oxide; 2,4,6-triorganobenzoyl diorganophosphonates, such as, 2,4,6-trimethylbenzoyl diethylphosphonate and 2,4,6-triethylbenzoyl diphenylphosphonate; 2,4,6-triorganobenzoyldiarylphosphine sulfides, such as 2,4,6-trimethylbenzoyldiphenylphosphine sulfide.

Included among the UV curable organic or organosilicon materials which can be employed in the practice of the present invention in combination with the acylphosphorus compounds include, for example, the hydrolysis products of silylacrylate and aqueous colloidal silica, and optionally in further combination with a polyfunctional acrylate, as shown by Olson, et al, U.S. Pat. No. 4,455,205, or Chung, U.S. Pat. No. 4,486,504, which are incorporated herein by reference. Additional UV curable organic or organosilicon materials which can be used in the practice of the present invention in combination with the acylphosphorus compounds are UV curable materials as shown by Chung, U.S. Pat. No. 4,478,876, Campbell, U.S. Pat. No. 4,477,529, and by Moore, et al, U.S. Pat. No. 4,198,465, which patents are incorporated herein by reference.

As used hereinafter, the term UV absorber or UV screen, or UV stabilizer, as distinguished from latent UV absorber, or latent UV screen, includes compounds selected from 2-hydroxybenzophenones, 2-hydroxyphenylbenzotriazoles and phenyl cyanoacrylates, which UV absorbers have an absorbance value when exposed to light in the range of from about 280 nm to about 360 nm. Some of the UV absorbers which can be utilized in the practice of the present invention in combination with the acylphosphorus compounds are conventional UV screens, such as 2-(2-hydroxy-5-t-octylphenyl)-benzotriazole, 2-hydroxy-4-n-octoxybenzophenone, 2,2'-dihydroxy-4-methoxybenzophenone, ethyl 2-cyano-3,3-diphenylacrylate and 2-hydroxy-4-acryloxyethoxybenzophenone.

Suitable substrates which can be treated in accordance with the practice of the present invention with the radiation curable organic coating composition to impart improved abrasion resistance, as well as improved weathering resistance are for example, thermoplastic films and sheets of organic thermoplastic polymers, such as aromatic polycarbonates, aromatic polyesters, polymethylmethacrylate, polystyrene, polyetherimides, and other high performance thermoplastics which can benefit from the treatment of the abrasion resistant coating compositions of the present invention. Depending upon the particular application, there can be used thermoplastic substrates in the form of films having a thickness ranging from at least 0.5 to 249 mils and thermoplastic sheet having a thickness of up to 1 inch, and preferable 0.25 to 0.5 inch.

As taught by Crouch, copending application Ser. No. 812,619, thermoplastic substrates with controlled surface characteristics can be obtained by applying the uncured radiation curable coating composition to the film followed by expelling air from the coating. The coating is then cured by directing radiant energy, such as ultraviolet light, through the film surface opposite the coated surface while it is in contact with a smooth or patterned substrate, such as highly polished chrome or plastic.

In instances where an inflexible thermoplastic sheet is treated with the UV curable composition of the present invention to impart improved surface characteristics thereto, the thermoplastic sheet can be treated initially with uncured coating material using a curtain coater, or roll coater followed by contacting the uncured coating material on the thermoplastic sheet surface with a flat sheet having a smooth or polished surface, such as a rigid plastic or metallic sheet, and thereafter passing radiant energy through the opposite thermoplastic sheet surface to effect cure of the coating material. The flat sheet having the polished surface can thereafter be separated from the cured coated article.

In instances where shaped thermoplastic substrates are desired having surfaces with improved optical clarity, fabrication of a mold having a highly finished inner surface is preferred. The coated thermoplastic part can be contacted to the smooth mold cavity prior to exposure to radiant energy.

An alternative method for making thermoplastic sheet having a highly finished abrasion resistant and weather resistant coating, is to laminate a treated thermoplastic film which has been cold casted with a UV curable organic coating material containing a UV absorber to a thermoplastic sheet. Lamination of the treated film to the rigid thermoplastic can be effected by using a UV curable material as an adhesive.

In addition to the aforementioned ingredients shown in the Statement of the Invention, the UV curable coating compositions of the present invention also can contain other ingredients, such as anti-oxidants, and hindered amine light stabilizers. An effective amount of the acylphosphorus compound is from about 0.3 part to about 10 parts by weight of the acylphosphorus compound, per 100 parts by weight of the UV curable coating material.

As indicated, cure of the organic coating material is preferably effected by using UV irradiation which can have a wavelength of from 360 nm to 410 nm. The lamp systems used to generate such radiation can consist of ultraviolet lamps such as from 1 to 50 discharge lamps, for example, xenon, metallic halide, metallic arc, such as a low, medium or high pressure mercury vapor discharge lamp, etc. having an operating pressure of from a few millitorr to about 10 atmosphere, etc., can be employed. The lamps can include envelopes capable of transmitting light of a wavelength of from about 184 nm to 800 nm, and preferably 240 nm to 450 nm. The lamp envelope can consist of quartz, such as Spectrocil or Pyrex, etc. Typical lamps which can be employed for providing ultraviolet radiation are for example, medium pressure arcs, such as the GE H3T7 arc, etc. The cures may be carried out with a combination of various lamps, some or all of which can operate in an inert atmosphere. In operating the lamp to achieve a desirable level of flux intensity required for effecting cures of the solventless coating composition in a pollution free manner, the lamps can be ballasted to provide a higher watts per inch input than that normally rated by the manufacturer. For example, the GE H3T7 lamp normally operated at 130 watts per inch, can be operated at up to 300 watts per inch input over a satisfactory operating life.

In order that those skilled in the art will be better able to practice the present invention, the following examples are given by way of illustration and not by way of limitation. All parts are by weight:

EXAMPLE 1

A radiation curable organic coating composition is prepared consisting of 57 parts of an aliphatic acrylated urethane (Echo resin ALU-2 of the Echo Resin and Laboratory Company, Varsailles, Mo.), 17 parts of a monofunctional acrylic carbonate monomer Acticryl 959 of SNPE Inc. Princeton, N.J. or Bergerac Cedex, France, 7 parts of 2-hydroxy-4-n-octoxybenzophenone (Cyasorb 531 of American Cyanamid, Wayne, N.J.) and 2 parts 2,4,6 trimethylbenzoyldiphenylphosphine oxide, (Lucirin TPO of BASF Aktiengesellschaft, Ludwigschafen, West Germany or Cherry Hill, N.J.).

The radiation curable coating composition is applied onto a 15 mil Lexan polycarbonate film in accordance with the cold cast procedure shown by Crouch, European Patent application 0,228,671 published Jul. 15, 1987, or Ser. No. 812,619 filed Dec. 23, 1985. The curable coating composition is applied to the film followed by expulsion of air from the coating by adjusting the pressure of the nip resulting from contact between the coated film and the smooth drum surface. Cure is effected using two Linde medium pressure mercury lamps operating at a total dose of 6.2 Joules/cm$^2$. The line obtained a composite of a polycarbonate film having a tack-free coating which exhibits excellent optical clarity, and superior weathering resistance.

EXAMPLE 2

The radiation curable composition of Example 1 is applied to a 4"×4.5" 0.25 inch thick Lexan polycarbonate panel using wire-wound draw-down bar. The treated panel is then UV cured in a model 1202AN UV processor, manufactured by the Pittsburgh Plate Glass Company, at a belt speed of 20 ft/min, under a nitrogen flow of 20 scfm, and at least 100 psi, resulting in a well-cured, tack-free coating.

As a result of the presence of Cyasorb-531, the resulting Lexan polycarbonate composite has a cured coating of an aliphatic acrylated urethane possessing excellent weathering characteristics.

EXAMPLE 3

A radiation curable composition was prepared by adding 70 parts of methacryloyloxypropyltrimethoxysilane to 468.3 parts Nalcoag 1034A having 34% by weight of colloidal silica in water and a product of the Nalco Company of Oak Brook, Ill. and 2250 parts isopropanol. There also was added, 0.2 part of methoxyhydroquinone as an inhibitor. The mixture was refluxed for 1.5-2.0 hrs, and 195.3 parts of hexanediol diacrylate was added. Volatiles were removed under 70 mm Hg of pressure. There was added to 91 parts of the resulting coating composition, 7 parts 2-(2-Hydroxy-5-t-octylphenyl)-benzotriazole, (Cyasorb 5411) a UV-light absorber of American Cyanamid and 2 parts of 2,4,6,trimethylbenzoyldiphenylphosphine oxide (TMBPO).

The above coating composition was applied at 105° F., to a 15 mil Lexan polycarbonate film at a line speed of 30 ft per minute in accordance with the previously described cold-cast method of Example 1. Adhesion testing of the resulting coating was done by scribing the coated area with a Gitterschmitt prufgerat cross-hatch cutter, applying 3M 610 tape to the cross-hatched area and rapidly pulling the tape from the cross-hatched area. Any coating removed constitutes failure. Abrasion resistance was determined by measuring the change in haze (% H) using a Gardner XL 800 series Haze Meter before and after 500 cycles on a model 5150 Taber Abraser of Teledyne, North Tonawanda, N.Y., equipped with SC-10F wheels and 500 g weights. Accelerated weathering was done by placing samples in a QUV device sold by the Q-panel Company of Cleveland, Ohio, set to consecutive cycles of fluorescent UV light using B lamps for 8 hours at 70° C. and 4 hours of high humidity at 50° C. Outdoor accelerated weathering in Arizona using the Sun10 Fresnel-reflecting concentrator, with night time wetting, according to ASTM test D4141-C, was conducted by South Florida Test Service, Miami, Fla., a division of Atlas Electric Devices. The % Haze and Yellow Index (YI) was measured using a Gardner mode Haze meter model XL 800 and Colorimeter, model XL 835.

In addition to the above UV curable coating composition, additional compositions were prepared containing the same coating composition but different classes of UV light absorbers. The results obtained are shown in the Table below where TMBPO is trimethylbenzoylphenylphosphine oxide and Cyasorb-416 is 2-hydroxy-4-acryloxyethoxybenzophenone. The Table below also shows a coating composition using 2 parts of a commercial photoinitiator, Daracur 1664 of EM Merck, Hawthorne, N.Y., and 7 parts of a latent UV screen in the form of a sulfonate ester of 2-(2-hydroxy-5-t-octylphenyl)-benzotriazole.

| Coating composition* | Taber Haze (500 cycles) | OUV Hrs** | % Haze | YI*** |
|---|---|---|---|---|
| 2 parts TMBPO 7 parts Cyasorb 5411 | 7.8 | 1390-1580 | 1.0 | 1.0 |
| 0.5 parts TMBPO 12 parts Cyasorb 416 | 9.1 | 1390-1580 | 1.6 | 1.8 |
| 2 parts Daracur 1664 7 parts Sulfonate ester | 7.4 | 500-880 | 3.1 | 7.4 |

*Coating compositions all cured by cold-cast at 30 ft/min and 105 F.
**Hrs before observable microcracking of the coating. Measurements made about every 250 hrs.
***% Haze and YI measured after an accelerated aging test equivalent to 2 yrs in South Florida (398,620 Langleys).

The above results show that the TMBPO composition at 0.5 part has a superior QUV performance and % haze to the commercial Daracur 1664 photoinitiator at 2 parts in combination with a latent UV screen.

EXAMPLE 4

A UV curable coating composition was prepared with 93.5 parts of the coating composition described in Example 3,5 parts 2-(2-hydroxy-5-t-octylphenyl)-benzotriazole (Cyasorb 5411 of American Cyanamid, Wayne, N.J.). The coating composition was applied to 0.25 inch thick Lexan polycarbonate sheet, stabilized with approximately 0.3% Cyasorb 5411, by sandwiching the coating composition between the polycarbonate plaque and a thin glass plate, thus excluding the oxygen from contact with the coating composition. The treated panel was then UV cured through the stabilized polycarbonate sheet in a model 1202AN UV processor, of the Pittsburgh Plate Glass Company, at a belt speed of 20 ft/min under air atmosphere using two 300 watt/-liner inch lamps. The thin glass plate was then removed. There was obtained a composite having a hard tack free optically clear coating which was resistant to scratching using steel wool.

EXAMPLE 5

A UV curable adhesive composition is prepared from 70 parts of an aliphatic urethane Abcure 2164 of American Biltrite, Trenton, N.J., 9.5 parts hexanediol dicarylate, 17.5 parts n-vinylpyrrolidone, and 3 parts 2,4,6 trimethylbenzoyldiphenylphosphine oxide. It is used to laminate a 36 inch×0.015 inch/Lexan polycarbonate film, which had been treated with the coating composition as described in Example 3, and thereafter cured in accordance with Example 1. The coated film is laminated to a 36 inch ×0.25 inch Lexan polycarbonate sheet by initially treating the 0.25 inch polycarbonate sheet with the above UV curable adhesive, contacting the 0.015 inch film section onto to treated sheet surface and there after effecting the cure of the adhesive in accordance with the procedure of Example 4.

There is obtained a polycarbonate laminate having excellent optical clarity and weatherability.

Although the above examples are directed to only a few of the very many variables which can be used in the practice of the present invention, it should be understood that the present invention is directed to a much broader variety of UV curable organic coating compositions and to thermoplastic composites made by using such radiation curable compositions as set forth in the description preceding these examples.

What is claimed is:

1. A method of coating a thermoplastic substrate comprising applying a UV curable coating composition onto the thermoplastic substrate and thereafter effecting the cure of the UV curable coating composition to produce a coated substrate having superior optical properties and weathering resistance, where the UV curable coating composition comprises by weight, (A) 100 parts of a UV curable organic material, a UV curable organosilicon material, or a mixture thereof, (B) 0.3 to 10 parts of an acylphosphorus compound which is effective for polymerizing the UV curable organic coating composition with light having a wavelength of from about 360 nm to about 410 nm and selected from the group consisting of an acylphosphine oxide, an acyl phosphonate and an acylphosphine sulfide, and (C) 0.5 to 20 parts of a UV absorber, 2. A method in accordance with claim 1, where the thermoplastic substrate is a polycarbonate substrate.

3. A method in accordance with claim 1, where the UV curable coating composition is cured in contact with a rigid smooth surface to impart improved surface characteristics to the resulting article.

4. A method of making a thermoplastic laminate having improved optical properties and weathering resistance comprising (a) cold casting a thermoplastic film with a UV curable coating compositing comprising by weight, (i) 100 parts of a UV curable organic material, a UV curable organosilicon material, or a mixture thereof, (ii) 0.3 to 10 parts of an acylphosphorus compound which is effective for polymerizing the UV curable organic coating composition with light having a wavelength of from about 360 nm to about 410 nm and selected from the class consisting of an acylphosphine oxide, an acyl phosphonate and an acylphosphine sulfide, and (iii) 0.5 to 20 parts of a UV absorber.

(b) contacting the resulting coated thermoplastic film to a thermoplastic sheet treated with a UV curable organic adhesive and, (c) effecting the cure of the UV curable organic adhesive through the thermoplastic sheet.

5. A thermoplastic composite having superior optical and weathering characteristics made in accordance with the method of claim 1.

6. A thermoplastic laminate having superior optical and weathering characteristics made in accordance with the method of claim 2.

* * * * *